(No Model.)

R. A. LUDLOW.
CHURN.

No. 502,628. Patented Aug. 1, 1893.

Witnesses,

Inventor,
Ross A. Ludlow
By Dewey & Co.
Attys.

UNITED STATES PATENT OFFICE.

ROSS A. LUDLOW, OF GLOBE, ASSIGNOR OF TWO-THIRDS TO LIONEL C. F. WYNNE AND OWEN H. O. WYNNE, OF HANFORD, CALIFORNIA.

CHURN.

SPECIFICATION forming part of Letters Patent No. 502,628, dated August 1, 1893.

Application filed April 20, 1893. Serial No. 471,204. (No model.)

*To all whom it may concern:*

Be it known that I, ROSS A. LUDLOW, a citizen of the United States, residing at Globe, Tulare county, State of California, have invented an Improvement in Churns; and I hereby declare the following to be a full, clear, and exact description of the same.

My invention relates to the class of churns, and it consists in the novel means hereinafter described and claimed for mounting, shaking and adjusting the cream containing vessel.

The objects of my invention are to provide a churn which by reason of the effective shaking imparted to the cream containing vessel, will make the butter with certainty and in short time, and will dispense with the use of a dasher, and also by reason of the adjustability of said vessel, will provide for proper positions at the several stages of the operation.

Figure 1:
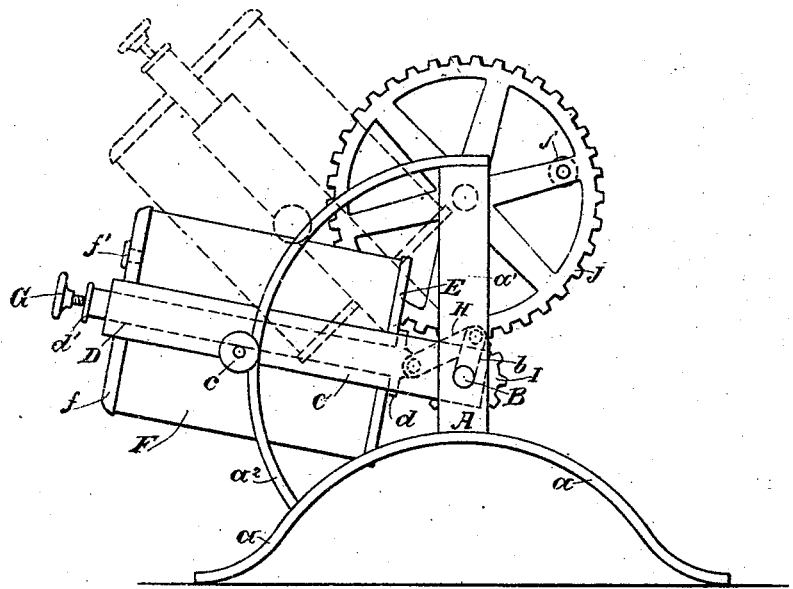
Figure 2:
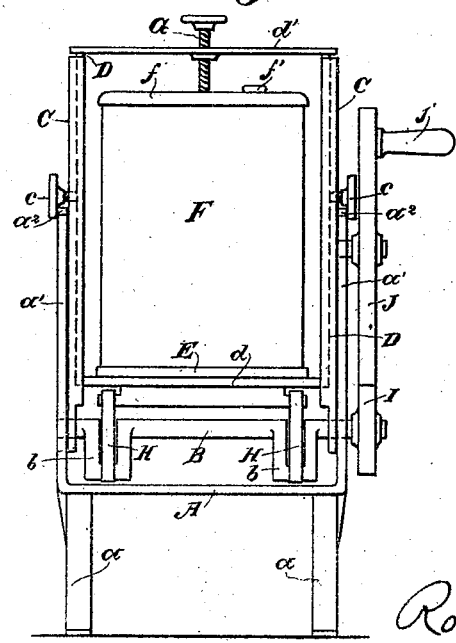

Referring to the accompanying drawings for a more complete explanation of my invention,—Figure 1 is a side elevation of my churn. Fig. 2 is a front view of the same.

A is a stand having suitably stable legs $a$, and uprights $a'$ from which extend to the legs the quadrant guides $a^2$. In the uprights $a'$, near their bases, is mounted a drive shaft B, having cranks $b$. Upon shaft B, near each end thereof and just within the uprights $a'$, are pivoted by their lower ends, the side arms C, which extend up beside the quadrant guides $a^2$, to which they may be secured at various angles by means of binding thumb-screws $c$. To the inner sides of these arms C are fitted the slides D, between the lower ends of which is secured a cross-bar $d$, and between their upper ends a cross-head or bar $d'$. Upon cross-bar $d$ is a platform or rest E for the cream-containing vessel F, the upper end of which has a removable cover $f$ fitted thereto by a suitable tight joint, and provided with a plug-controlled air aperture $f'$. A binding-screw G fitted to the cross-head $d'$ bears upon the cover $f$, and thus holds the vessel F firmly and tightly between the two bars.

Rods H connect the cranks $b$ of drive shaft B with the cross-bar $d$. Rotation is imparted to the drive shaft by means of a pinion I upon one end, with which engages a gear J mounted upon the side of one of the uprights $a'$ and having a handle $j$.

The operation is as follows:—The cream is supplied to vessel F, and the cover $f$ being replaced, the vessel is then mounted upon its rest, and is held by the screw G. At the beginning of the operation the best position for the effective agitation of the contents of the vessel is an extremely inclined one, and to obtain this the binding screws $c$ are loosened and the arms C are turned down to the proper inclination and are there held by setting up the screws to the quadrant guides $a^2$. The shaft B is then rotated and this, through its cranks $b$ and the connecting rods H, operating on the cross-bar $d$, effects the rapid reciprocation of the slides D and the cream vessel F. At a later stage of the process, as when the butter is separating, it is best to lift the vessel to an angle nearer the vertical which is easily done as before described, and then the agitation is continued. At the final stage, the vessel is returned to a perpendicular. During the process, at proper times, the plug-controlled vent $f'$ may be opened.

No dasher is needed, and the whole interior of the churn being clear is easily cleansed, and there are fewer parts to keep clean. The motion imparted to the vessel produces an effective agitation and results in the rapid completion of the process.

It is obvious that the device may be used to agitate liquids other than cream, and will be found very effective as a shaker of beverages.

Having thus described my invention, what I claim as new, and desire to secure by Letters Patent, is—

1. A churn consisting of a stand, a frame pivoted to said stand, means for securing the said frame to the stand at various angles, a liquid containing vessel supported to slide in said frame, at various angles to the stand, and means for reciprocating said vessel, substantially as herein described.

2. A churn consisting of a stand, arms pivoted to said stand means for securing them at various angles, slides carried by said arms, and having cross-bars, a liquid containing vessel secured between said bars and a drive shaft and connections with the cross-bar of the slides whereby they and the liquid containing vessel are reciprocated, substantially as herein described.

3. A churn consisting of a stand, a drive shaft mounted in said stand and having cranks, the arms pivoted on said shaft, and adapted to be turned to and secured at various angles, the slides fitted to said arms and having the cross-bars, the liquid containing vessel secured between the cross-bars and the rods connecting the cranks of the drive shaft with the cross-bar of the slides, substantially as herein described.

4. A churn consisting of a stand, having the quadrant guides, the drive shaft mounted in said stand and having the cranks, the arms pivoted on said shaft and having the binding screws whereby said arms are adapted to be turned to and secured in various positions on the quadrant guides, the slides fitted to said arms and having the cross-bars, the liquid containing vessel secured between the cross-bars and the rods connecting the cranks of the drive shaft with the cross-bar of the slides, substantially as herein described.

5. A churn consisting of a stand, a drive-shaft mounted in said stand and having cranks, the arms pivoted on said shaft and adapted to be turned to and secured at various angles, the slides fitted to said arms and having the lower cross-bar and the upper cross-head, the rest or platform secured to the lower cross-bar, the liquid containing vessel supported upon said rest, the screw in the upper cross-head for binding on the top of the vessel and the rods connecting the cranks of the drive shaft with the lower cross-bar, substantially as herein described.

In witness whereof I have hereunto set my hand.

ROSS A. LUDLOW.

Witnesses:
S. H. NOURSE,
J. A. BAYLESS.